Patented Nov. 5, 1929

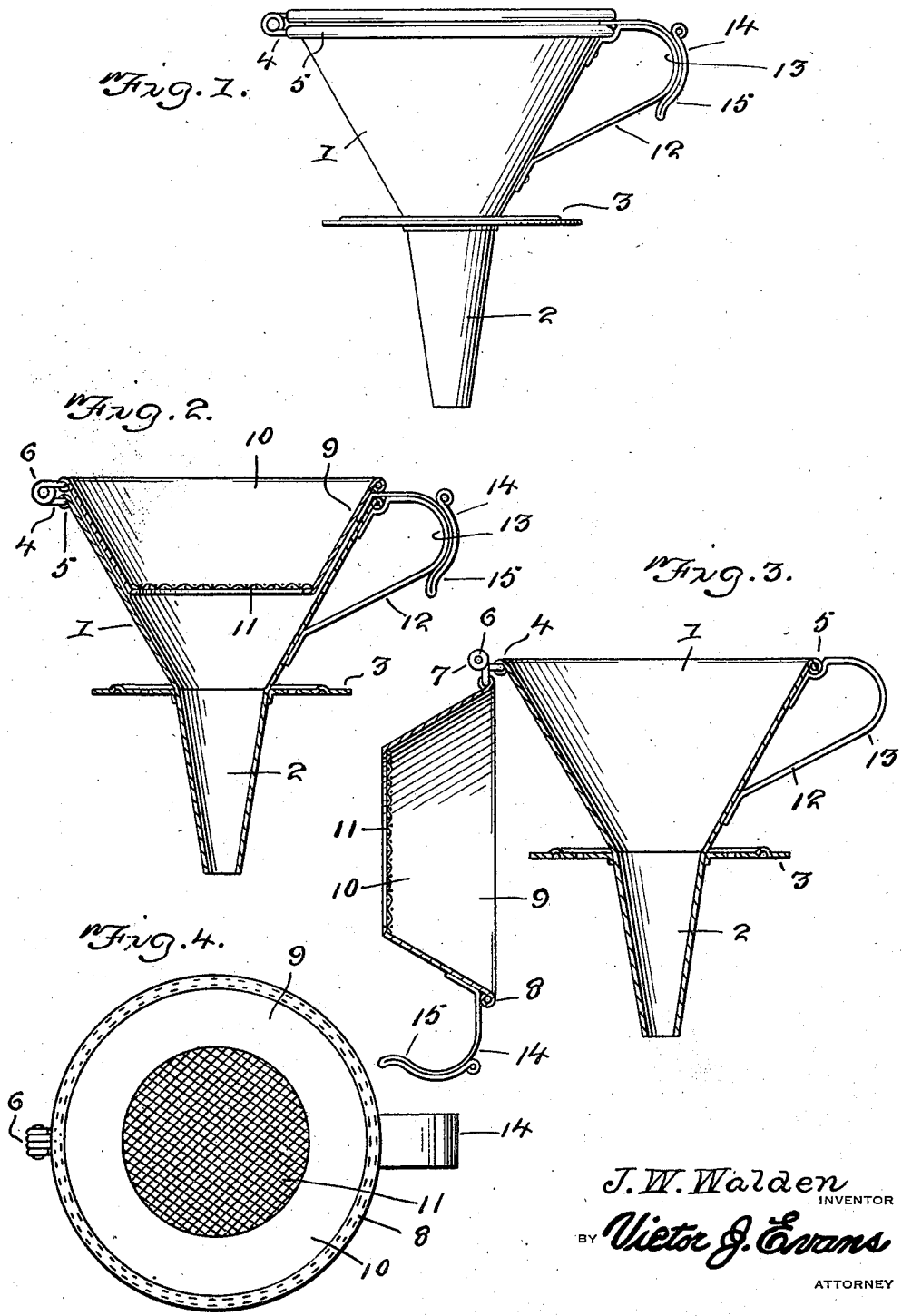

1,734,841

UNITED STATES PATENT OFFICE

JOHN W. WALDEN, OF ABILENE, TEXAS

STRAINING FUNNEL

Application filed April 10, 1928. Serial No. 269,002.

My present invention has reference to a combined funnel and strainer, an object being to provide an ordinary funnel with a strainer which is swingably connected to the funnel and designed to be arranged in the mouth thereof, said strainer having an arched spring handle adapted for frictional engagement with the handle of the funnel for sustaining the strainer in the funnel and likewise permitting the strainer to be easily swung outwardly and suspended from the funnel, the construction being such that the funnel may be employed without the strainer when fluid, not requiring straining is poured through the same and likewise the parts being of such construction and so associated that both the funnel and the strainer may be readily cleaned.

A further object is the provision of a combined funnel and strainer in which the funnel is formed with a base at the junction of the body with the spout thereof, so that the body can be inserted in comparatively large mouthed vessels and the funnel sustained in a vertical position thereon.

To the attainment of the foregoing and other objects which will present themselves as the nature of the invention is better understood, the improvement also resides in certain other novel features of construction which will hereinafter be set forth in the following description, illustrated by the drawings and pointed out with particularity in the appended claim.

In the drawings:

Figure 1 is a side elevation of my improvement.

Figure 2 is a central vertical longitudinal sectional view therethrough.

Figure 3 is a view similar to Figure 2, but showing the strainer swung outwardly of and sustained on the top of the funnel.

Figure 4 is a plan view of the device as illustrated in Figures 1 and 2.

In the drawings the flared body of the funnel is indicated by the numeral 1 and the spout by the numeral 2. At the juncture of the body and the spout the body is formed with an outstanding annular flange that provides a base 3. The base permits of the spout of the funnel being arranged in large mouthed receptacles and being sustained in a vertical position thereon.

The mouth of the body is rolled in the usual manner and passing through this rolled portion there is a reinforcing wire 4. This wire has a portion that passes through the bead 5, the said portion being bent to form the same with a loop 6, and this loop is designed to be engaged by an eye 7 formed on one end of a wire reinforcement for the beaded edge 8 of the inwardly flared body portion 9 of the strainer 10. The open and reduced end of the body 9 has arranged therein a reticulated disc 11 that provides the strainer. As far as the description has progressed it will be seen that the strainer is hingedly connected to the mouth of the funnel and may be swung into the body of the funnel as shown in Figures 1, 2 and 4 of the drawings, or the said strainer may be swung outwardly of the funnel and arranged pendent therefrom as disclosed by Figure 3 of the drawings.

The flared body of the funnel at a point directly opposite the hinged connection between the strainer and the funnel is provided with the usual handle 12 that has an upper and outer curved grip portion 13. The body 9 of the strainer 10 has secured thereto a curved or arched spring handle 14, the outer end of said handle being disposed at a slight angle to afford the grip 15 for the handle. The spring handle 14 is designed to be disposed over and to frictionally engage with the handle of the funnel and thereby hold the strainer in the funnel. As the rounded portion 15 of the handle for the strainer is disposed directly over the rounded portion 13 of the handle 12 of the funnel it will be noted that the funnel with the strainer therein may be conveniently moved from place to place and likewise by gripping the end 15 of the spring handle 14 the strainer may be swung outwardly from the funnel and sustained pendent with respect thereto as disclosed by Figure 3 of the drawings. It will be further noted that both the funnel and the strainer may be easily and effectively cleaned and likewise that by swinging the strainer outward from the funnel residue received in the strainer may be dumped therefrom.

Having described the invention, I claim:

A funnel having a bead surrounding the mouth thereof, a reinforcing wire in the bead, having a looped portion projecting through the bead and having a handle whose upper and outer portion is rounded and connected at a point diametrically opposite the loop, a strainer having a flared body portion and having its mouth beaded, a reinforcing wire passing through the bead and having a part extending through the bead and formed with an eye to engage with the loop for hingedly connecting the strainer to the funnel and the body of the strainer having a curved spring arm designed to overlie and frictionally engage the rounded portion of the handle when the strainer is swung into the funnel.

In testimony whereof I affix my signature.

JOHN W. WALDEN.